United States Patent [19]

Lewis

[11] 4,220,000
[45] Sep. 2, 1980

[54] FUEL CONTROL SYSTEM FOR A GAS TURBINE ENGINE

[75] Inventor: Geoffrey A. Lewis, Solihull, England

[73] Assignee: Lucas Industries Limited, Birmingham, England

[21] Appl. No.: 896,445

[22] Filed: Apr. 14, 1978

[30] Foreign Application Priority Data

Jun. 18, 1977 [GB] United Kingdom ............... 25581/77

[51] Int. Cl.³ .............................................. F02C 9/38
[52] U.S. Cl. .............................................. 60/39.28 R
[58] Field of Search ................................. 60/39.28 R

[56] References Cited

U.S. PATENT DOCUMENTS

| | | | |
|---|---|---|---|
| 3,252,283 | 5/1966 | Jackson et al. | 60/39.28 |
| 3,434,395 | 3/1969 | Londal | 60/39.28 |
| 3,611,721 | 10/1971 | Ifield | 60/39.28 |
| 3,913,316 | 10/1975 | Conale et al. | 60/39.28 |

*Primary Examiner*—Louis J. Casaregola

[57] ABSTRACT

A gas turbine engine fuel control system has a pump driven by the engine, a spill valve responsive to an increase in pump delivery pressure to increase spill flow from a supply line between the pump and the engine, and a further valve in series with the spill valve, the further valve being responsive to an increase in the delivery pressure of the engine compressor to reduce spill flow of fuel.

2 Claims, 4 Drawing Figures

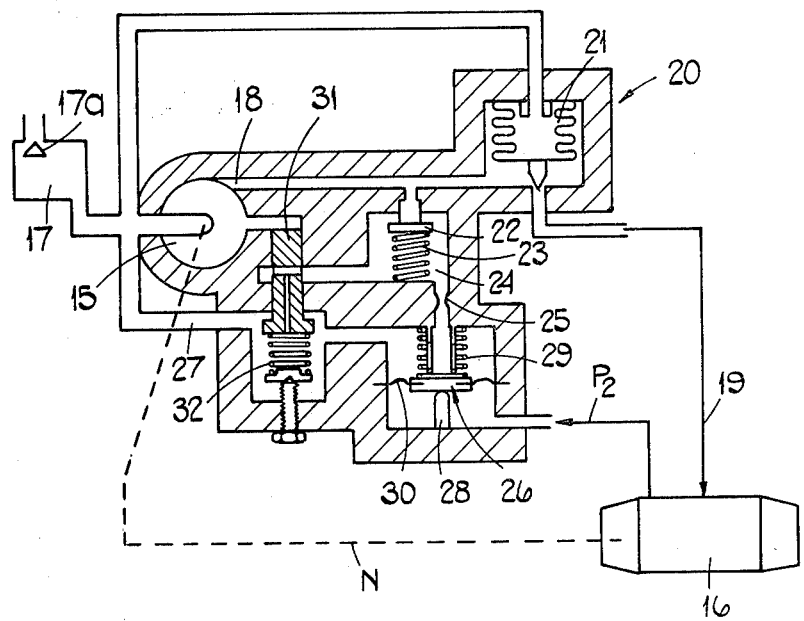
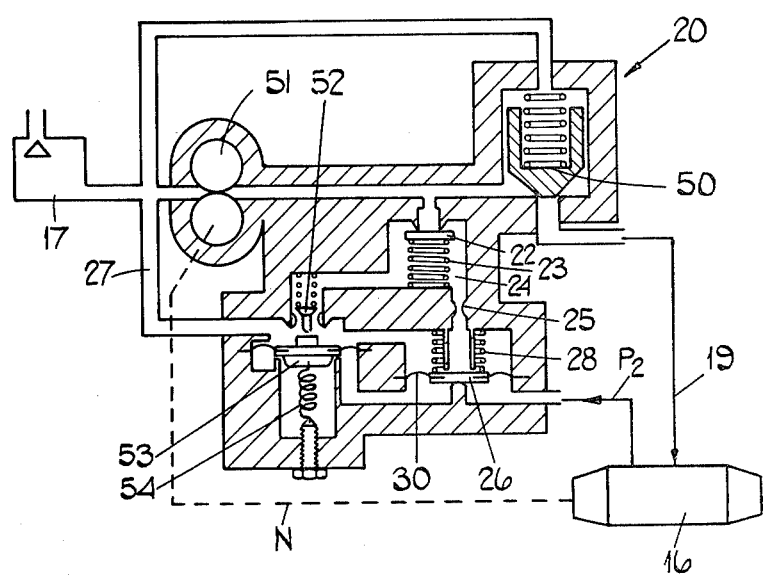

FUEL CONTROL SYSTEM FOR A GAS TURBINE ENGINE

This invention relates to fuel control systems for gas turbine engines.

There is a requirement to provide small, expendable gas turbine engines for use in test vehicles, pilotless, or target vehicles, and it is desirable that the fuel control systems for such engines should be both light and simple.

It is an object of the present invention to provide such a fuel control system.

According to the invention a fuel control system for a gas turbine engine comprises a pump adapted to be driven by the engine, a first, spill valve for spilling fuel from the outlet of said pump, and a second valve, in series with said first valve between the pump outlet and a low pressure zone, said second valve being responsive to an increase in the delivery pressure of a compressor of the engine to reduce spill flow.

According to a preferred embodiment a fuel control system as aforesaid includes a third valve in parallel with said second valve, said third valve being responsive to an increase in engine speed about a predetermined value to increase spill flow.

Examples of the invention will now be described with reference to the accompanying drawings in which:

FIG. 3 shows one embodiment of a fuel control system according to the present invention, and FIG. 4 shows an alternative embodiment of a fuel control system according to the present invention.

Figure 1:
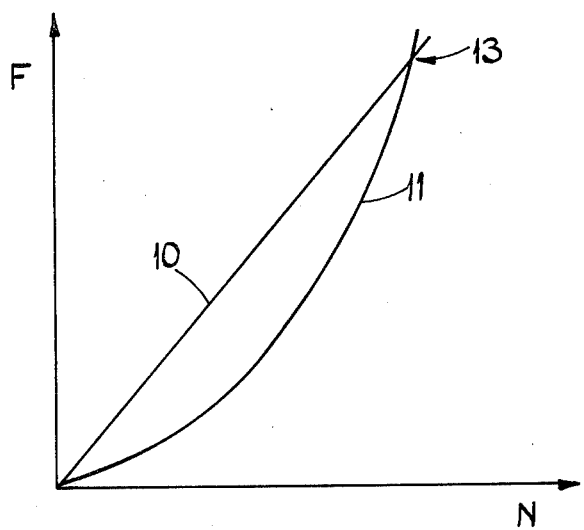
FIG. 1 shows the fuel flow characteristics of a known fuel control system.

British Pat. No. 1182602 discloses a fuel control system having a pump and a throttle valve in a delivery passage of the pump, the throttle valve being responsive to an increase in a pressure rise within the pump to reduce fuel flow from the pump. The pump is, in use, driven by a shaft of an associated engine, the arrangement being such as to provide, as indicated at 10 in FIG. 1 a characteristic in which fuel flow F is directly proportional to engine speed N. Line 11 in FIG. 1 indicates the fuel flow requirement of the engine for steady running at any given speed. The actual fuel flow is thus in excess of the steady-running fuel requirement, and the engine continues to accelerate until the actual fuel flow coincides, as indicated at 13, with the steady running requirement, the speed at this point being the maximum engine speed. The acceleration margin is substantial over much of the operating range of the system, and at higher speeds may result in over heating or stall of the engine compressor.

The control system shown in FIG. 3 has a centrifugal pump 15 driven by the compressor shaft of an engine 16. The pump 15 can draw fuel from a tank 17 in which an initial pressure may be retained by means of a non-return valve 17a. The outlet 18 of the pump 15 communicates with a fuel supply line 19 for the engine burners by way of a pressure-responsive valve 20. A closure member for the valve 20 is controlled by a bellows 21 which is subjected externally to the pressure at the pump outlet 18 and internally to the pressure at the inlet of the pump. A spill valve 22 is biased by a spring 23 against the pressure at the pump outlet 18, and is operable to spill fuel to a chamber 24. The chamber 24 communicates by way of a flow restrictor 25 and a further valve 26 with a low pressure return line 27, the line 27 communicating with the inlet of the pump 15. The valve 26 is biased to an open position against a stop 28 by a spring 29. The valve 26 is urged against the spring 29 by the delivery pressure P2 of a compressor of the engine 16, acting on a diaphragm 30.

A spool valve 31 is in parallel with the series arrangement of the restrictor 25 and valve 26, and is operable to connect the chamber 24 to the low pressure return line 27. The valve 31 is urged shut by an adjustable spring 32 and is movable against the spring by the static pressure within the pump 15.

Figure 2:
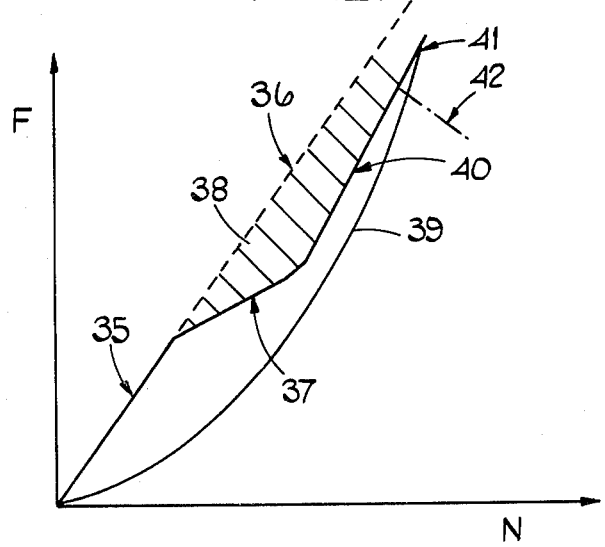
FIG. 2 shows the fuel flow characteristics of the present invention.

When the engine 16 is not running the resilience of the bellows 21 maintains the valve 20 shut, and an initial pressure within the tank 17, acting on both sides of the bellows 21, does not cause the valve 20 to open. The dimensions of the bellows 21 are such that when the engine 16 is started the valve 20 opens at approximately 10% of the maximum pressure which the pump 15 can deliver. The springs 23, 29, 32 are arranged so that at this stage the valves 22 and 31 are shut and the valve 26 open. Fuel flow F to the engine 16 is thus directly proportional to the speed N of the engine compressor shaft, this condition being indicated at 35 in FIG. 2. In order to avoid having a large acceleration margin of fuel at higher engine speeds, the spill valve 22 opens at a predetermined level of pressure at the pump outlet 18. Spilled fuel passes through the chamber 24, restrictor 25, valve 26 and return line 27 to the pump inlet. Spill flow is at this stage controlled by the restrictor 25 and is such that the resultant total flow through the pump outlet 18 is choked. Choked flow at the pump outlet 18 has the effect that this flow is substantially constant for a given speed and rises linearly with increasing speed, as indicated at 36 in FIG. 2. Fuel flow F to the engine 16, with spill valve 22 open and the valve 26 also wide open, is indicated at 37 in FIG. 2, the zone 38 between the choked flow line 36 and the engine fuel delivery line 37 corresponding to spill flow for the several values of engine speed N. The slope of the line 37 may be varied by changing the flow area of the restrictor 25, but increasing this slope so as to intercept with the steady-running line 39 at the desired engine speed may result in increasing the acceleration margin sufficiently to result in the afore-mentioned disadvantages of over heating and compressor stall. Accordingly, therefore, the slope of the line 37 is arranged so as substantially to reduce the acceleration margin.

At a predetermined level of compressor delivery pressure P2 the valve 26 is urged against the spring 29 to reduce spill flow. Fuel flow F to the engine 16 thus increases more rapidly with increasing engine speed N, but at a rate determined by the rise in compressor delivery pressure P2, as indicated at 40 in FIG. 2. The intersection of the line 37, 40 is determined by the pre-load in the spring 29, and can be adjusted to cause the line 40 to intersect the steady-running line 39 at the desired maximum engine speed, as indicated at 41. However, such an arrangement may result in poor control of engine speed, since the lines 39, 40 do not intersect sharply. Accordingly, therefore, the spring load on the valve 31 may be adjusted so that this valve opens at a predetermined static pressure in the pump 15, that is at a predetermined value of engine speed N, to reduce fuel flow to the engine, as indicated by line 42, resulting in a sharp intercept with the steady running line 39.

The alternative embodiment shown in FIG. 4 is generally similar to that shown in FIG. 3, corresponding parts being allocated similar reference numerals. In this embodiment the control element for the pressure responsive valve 20 is a spring loader plunger 50 which is responsive to both pump delivery pressure and to an initial pressure in the tank 17. A gear pump 51 has been substituted for the centrifugal pump 15 and is driven by the engine compressor shaft, as before. A spring loaded valve 52 is in parallel with the series arrangement of the restrictor 25 and valve 26, to interconnect chamber 24 and the low pressure return line 27. The valve 52 is biased shut and may be urged open by a diaphragm assembly 53 which is movable against an extension spring 54 by the compressor delivery pressure P2. The initial tension in the spring 54 is adjustable so that the valve 52 is open, to provide a fuel flow line corresponding to 42 in FIG. 2, at a predetermined level of compressor pressure P2. The valve 52 thus sets a maximum fuel delivery which corresponds to an upper level of engine thrust.

It will be understood that the valve plunger 50, the gear pump 51 or the valve arrangement 52, 53, 54 may be substituted either singly or in any combination for the corresponding components in the embodiment shown in FIG. 3.

I claim:
1. A fuel control system for a gas turbine engine, comprising a pump adapted to be driven by the engine, a first, spill valve for spilling fuel from the outlet of said pump, a second valve in series with said first valve between the pump outlet and a low pressure zone, said second valve being responsive to an increase in the delivery pressure of a compressor of the engine to reduce spill flow, and a third valve in parallel with said second valve, said third valve being responsive to an increase in said compressor delivery pressure to increase spill flow.

2. A system as claimed in claim 1 which includes a fourth valve through which fuel can flow from said pump to the engine, and biasing means urging said fourth valve shut, said fourth valve being urged against said biasing means by an increase in the delivery pressure of said pump.

* * * * *